(12) United States Patent
Cortez et al.

(10) Patent No.: US 7,564,805 B1
(45) Date of Patent: Jul. 21, 2009

(54) SYSTEMS, METHODS, AND DEVICE FOR SIMULATING CAPACITY IN A NETWORK

(75) Inventors: Bruce Gilbert Cortez, Freehold, NJ (US); Sanja Durinovic-Johri, Aberdeen, NJ (US); Pravin K. Johri, Aberdeen, NJ (US)

(73) Assignee: AT&T Intellectual Property, II, L.P., Bedminster, NJ (US)

( * ) Notice: Subject to any disclaimer, the term of this patent is extended or adjusted under 35 U.S.C. 154(b) by 626 days.

(21) Appl. No.: 11/199,538

(22) Filed: Aug. 8, 2005

(51) Int. Cl.
*H04L 12/28* (2006.01)
(52) U.S. Cl. ...................................... 370/255; 709/226
(58) Field of Classification Search ................ 370/244, 370/248, 252–256; 703/1–5; 709/223, 224
See application file for complete search history.

(56) References Cited

U.S. PATENT DOCUMENTS

| | | | | |
|---|---|---|---|---|
| 6,047,118 A | * | 4/2000 | Sofman et al. | 703/13 |
| 6,137,775 A | * | 10/2000 | Bartlett et al. | 370/216 |
| 6,209,033 B1 | * | 3/2001 | Datta et al. | 709/224 |
| 2005/0195739 A1 | * | 9/2005 | Grover et al. | 370/225 |

* cited by examiner

*Primary Examiner*—Ricky Ngo
*Assistant Examiner*—Ben H Liu
(74) *Attorney, Agent, or Firm*—Michael Haynes PLC; Michael N. Haynes

(57) ABSTRACT

Certain exemplary embodiments can include, but are not limited to, a method that can include, but is not limited to, a plurality of activities, that can include, but are not limited to: via a capacity planning simulation, for a circuit affected by a failure scenario of a communication network: failing the affected circuit; and rendering an indication that a selected unaffected link has a maximum available capacity of at least a predetermined amount of capacity associated with the communication network being fully restorable.

30 Claims, 7 Drawing Sheets

SYSTEMS, METHODS, AND DEVICE FOR SIMULATING CAPACITY IN A NETWORK

BRIEF DESCRIPTION OF THE DRAWINGS

A wide variety of potential embodiments will be more readily understood through the following detailed description of certain exemplary embodiments, with reference to the accompanying exemplary drawings in which.

DETAILED DESCRIPTION

Certain exemplary embodiments comprise a method comprising a plurality of activities, comprising: via a capacity planning simulation, for a circuit affected by a failure scenario of a communication network; failing the affected circuit; and rendering an indication that a selected unaffected link has a maximum available capacity of at least a predetermined amount of capacity associated with the communication network being fully restorable.

There are a number of types of circuit-based communication networks, such as:
1. an optical switch or optical cross connect network;
2. an ATM network;
3. a Frame Relay network;
4. a network of MPLS enabled label switched routers; and
5. a network of Lambda (optical wavelength) routers;
6. etc.

These networks can comprise a number of switches (or routers) connected by communication links. There can be multiple links between a given pair of switches and not every pair of switches needs to be connected to each other. Links can be of various sizes that generally can be expressed in bandwidth units such as OC-48, OC-192, etc. Bandwidth of connections can be expressed in STS-1 units. An STS-1 is equivalent to an OC-1. An OC-48 link has a total available bandwidth of STS-48 for circuits. A link consisting of two OC-48 lines has a total bandwidth of STS-96. End systems can be connected to the network but are not considered part of it. A circuit between end systems can be established by routing it between the two switches connected to the end systems and can span multiple links. The sequence of links spanned by the circuit can be called its service (or working) route (or path). If there is a failure in the network affecting one or more of the links or switches in the service route of the circuit, then the circuit fails as well. In this case, the circuit can be re-routed on a new restoration route that avoids the failed portions of the network. When the failure is repaired, the circuit can be reverted back to its original service route.

Figure 1:
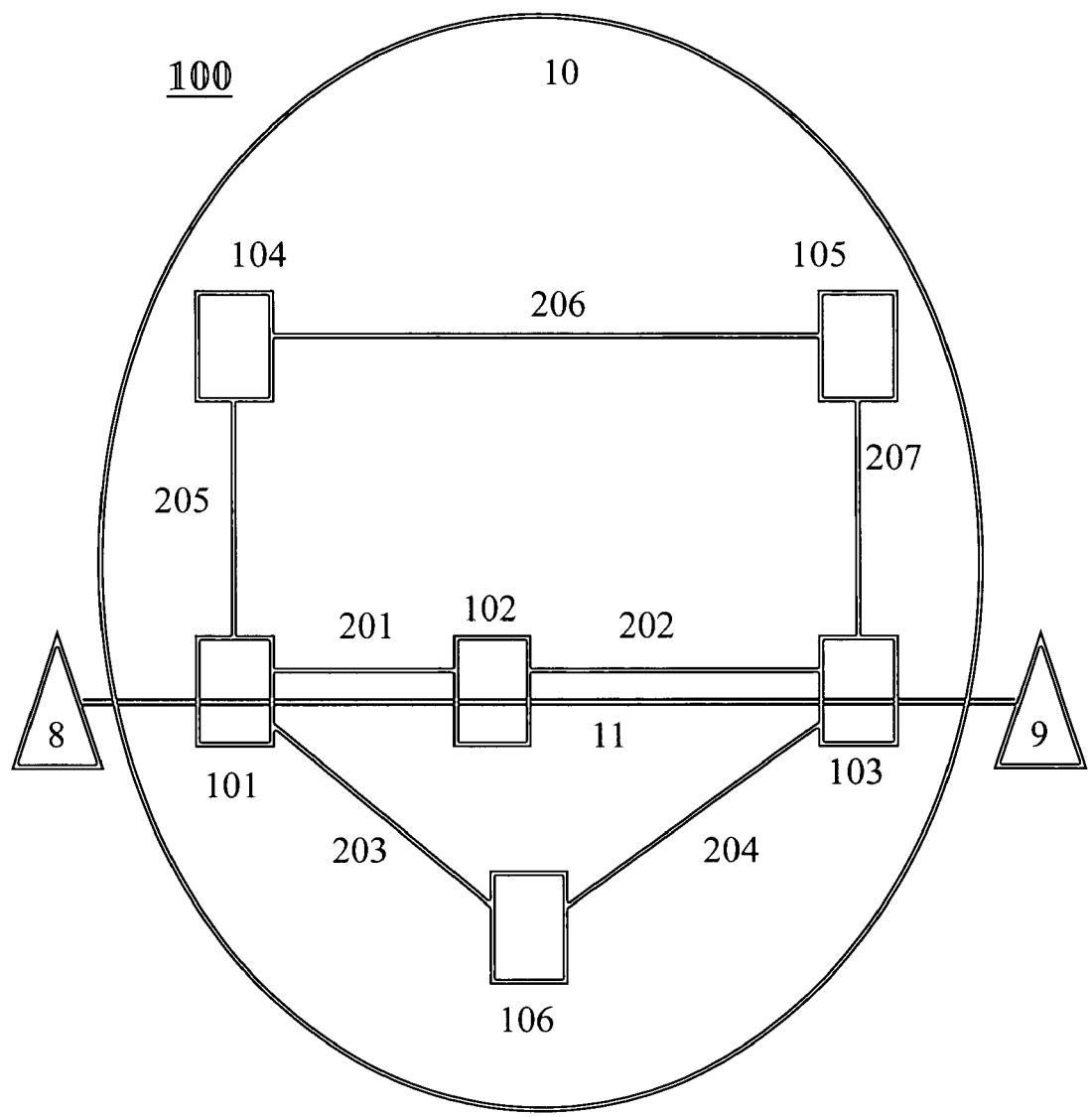
FIG. 1 is a block diagram of an exemplary embodiment of a system 100.

FIG. 1 is a block diagram of an exemplary embodiment of a system 100, which can comprise a network 10, which can comprise switches 101, 102, 103, 104, 105, and 106, which can be coupled as shown by links 201, 202, 203, 204, 205, 206, and 207. Network 10 can be coupled to end systems 8 and 9. A circuit 11 can be formed between end systems 8 and 9 and through switches 101, 102, and 103, via links 201 and 202, plus links from network 10 to end systems 8 and 9.

In general, networks can use Routing and/or Signaling protocols to automate a variety of functions, such as:
1. self-discovery of network resources;
2. construction and maintenance of a link-state database of routing information across all switches;
3. automatic provisioning and restoration of circuits;
4. determination of paths for provisioning and restoration of circuits;
5. detection of network failure conditions; and/or
6. flooding of information related to any change in the state of the network to all switches, including failures of switches and links, change in available bandwidth on a link;
7. etc.

The Routing and/or Signaling protocols can include OSPF, MPLS, PNNI, etc., and/or variants of these standard protocols that have been adapted to specific networks and/or applications.

The networks can be characterized by the fact that the intelligence can be distributed in every switch and typically is not centralized in one or more central locations. Typically, all switches run the same set of protocols although the functions performed by the switches can vary somewhat based on how switches are used. For example, border switches in an OSPF domain can have greater functionality than other switches. Thus, while employing the same or similar protocols, the switches can operate independently of each other. Any coordination of activities between switches typically is done by sending messages to each other in ways prescribed by the routing and signaling protocols.

Provisioning a New (Service) Circuit

A new circuit order between a pair of switches can be provisioned as follows:
1. One of the switches can be selected as the source of this circuit and the other as the destination.
2. The source switch can calculate a path for the circuit using information collected by the Routing protocol. The collected information typically includes network topology, available network resources, etc. Typically, the path must have sufficient network resources to meet the quality of service requirements (bandwidth, delay, etc.) of the circuit.
3. Then, the source switch can set-up the circuit using the Signaling protocol. A setup message can be sent out along the selected path of the circuit. Each switch in the path can check to see if the requested resources are available and then can allocate the resources to the circuit. If all switches are able to allocate the resources, then the setup can be considered to succeed, and it can be considered to fail otherwise. An unsuccessful setup attempt can result in a "crankback" message to the source that then can try to set the circuit up on a different path. Typically, the new path must also have sufficient resources to meet the needs of the circuit.

Path Generation

Typically, paths are generated using variants of Dijkstra's shortest path algorithm. Each link can have at least one provisioned administrative weight. Links can be bi-directional and/or can have different weights in either direction or they can be the same. The weight of a path is typically the sum of the weight of the links in the path. Dijkstra's algorithm seeks to find the path with the minimum weight and this path is called the shortest path.

Figure 2:
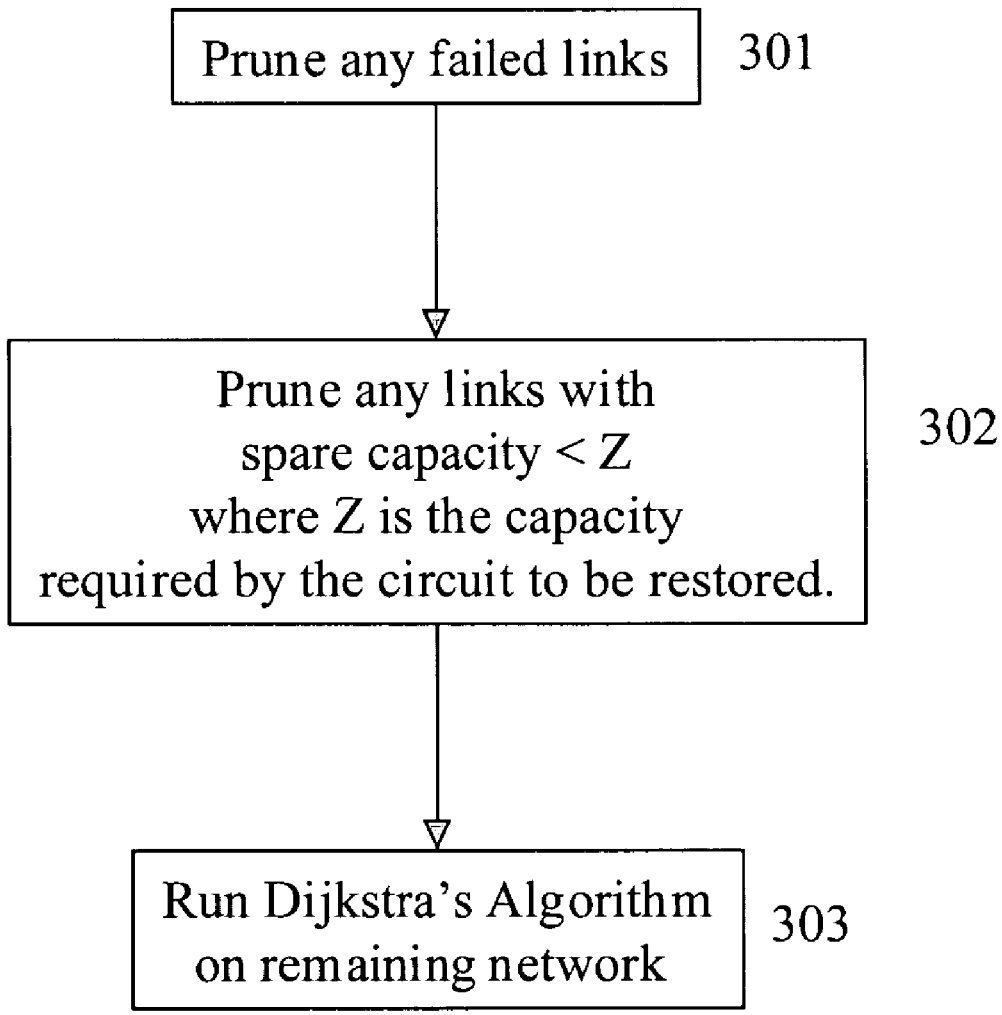
FIG. 2 is a flowchart of an exemplary embodiment of a method 300.

FIG. 2 is a flowchart of an exemplary embodiment of a method 300, which can comprise certain high-level steps that are typically involved in finding a path for a circuit. At activity 301, failed links can be pruned or deleted from consideration. At activity 302, links with insufficient available capacity to carry a circuit can be pruned or deleted from consideration. At activity 303, Dijkstra's algorithm (or a variant thereof) can be applied to the remaining network to obtain either the shortest path or an indication that no path exists.

Restoration of Failed Circuits

Whenever there is a link and/or switch failure, a number of circuits can be impacted. The switches adjacent to the failure can first detect the failure condition, identify the circuits affected by it, and/or then initiate signaling messages releasing these circuits. The release messages can travel back to the source and/or to the destination of the circuit, releasing all resources held by the circuit along the way. The source switch then can need to determine a new path and/or can try to establish the failed circuit on this new path. This is called restoring the circuit. Typically, the new path must have sufficient resources to meet the needs of the circuit. It typically must also avoid the failed part of the network. Often there are several alternate paths available for restoration. Generally, the procedure used to restore the circuit can be identical to the method used to provision it in the first place and the switches can try to find the shortest restoration path. Failures can be temporary, and typically are repaired in a relatively short amount of time.

Figure 3:
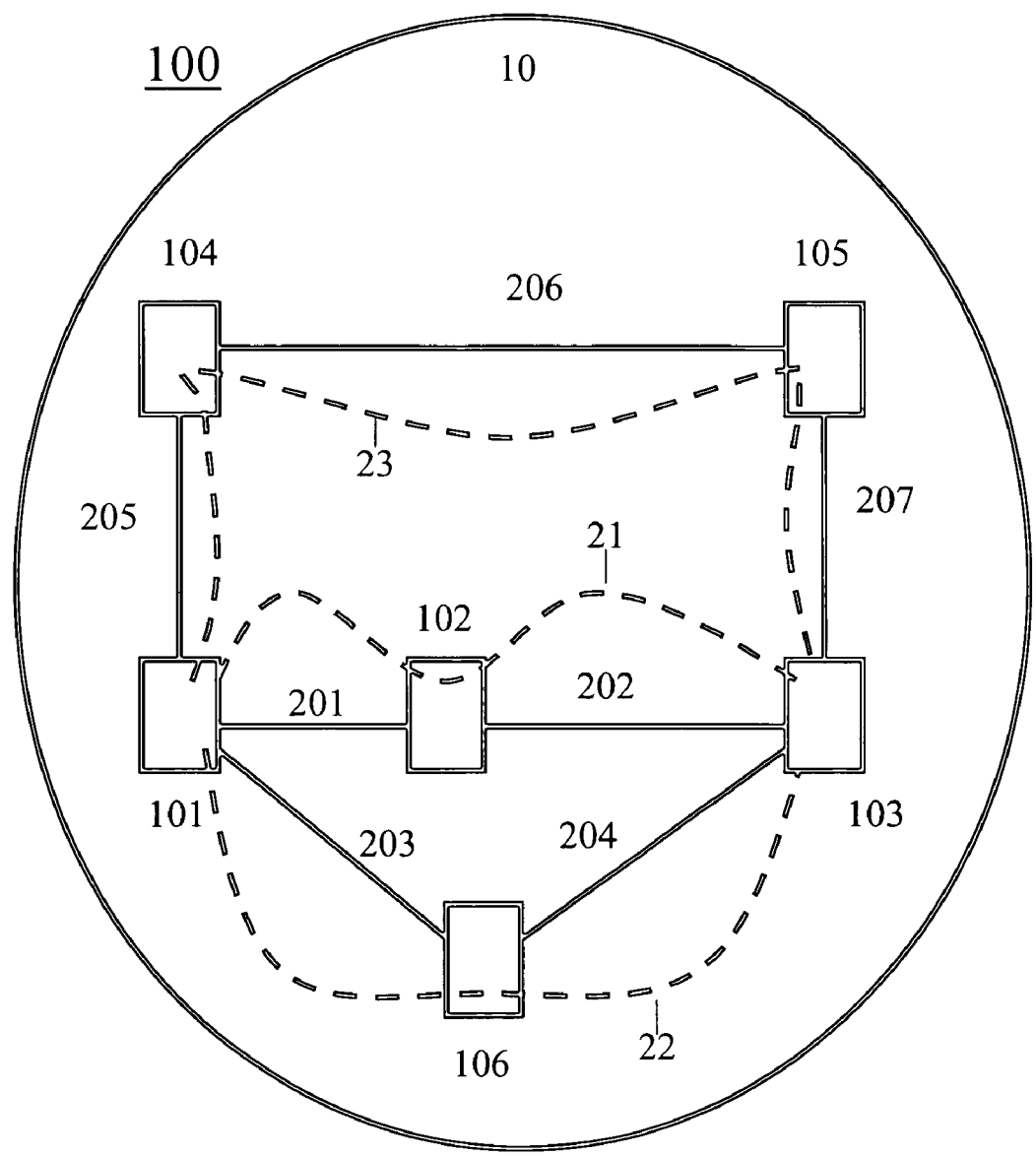
FIG. 3 is a block diagram of an exemplary embodiment of system 100.

FIG. 3 is a block diagram of an exemplary embodiment of system 100, which can comprise a working path 21 that can comprise links 201 and 202. A first, shorter restoration path 22 can comprise links 203 and 204. A second, longer restoration path 23 can comprise links 205, 206, and 207.

Restoration Capacity

For successful restoration, particularly with large failure events such as fiber cuts, typically there must be adequate spare (restoration) bandwidth in the network. Often a fiber cut takes out several links. Consequently, the network can maintain many spare links worth of restoration capacity on potential restoration paths. Since failures can occur anywhere in the network, spare restoration capacity can be maintained throughout the network.

Link Utilization & Link Characterization

In communication networks, the utilization of links can be tracked and/or links can be characterized as red (link capacity is at or close to exhaust), yellow (link capacity will exhaust relatively soon), and/or green (there is ample link capacity for now). The number of categories and the rules used to characterize links can vary and categories red, yellow, and/or green are only one example of such a characterization.

Link utilization can include capacity for both working traffic and for restoration. The remaining capacity of the link can be referred to as the available (spare) capacity. The working capacity of a link can be the capacity used by all circuits provisioned on the link and can be directly measured. Tools that can simulate failure scenarios can be used to estimate the restoration capacity.

One typical aim for a communication network is to be fully restorable. That is, for all failure scenarios under consideration, it can be desired that there be sufficient capacity in the network to restore all affected circuits. The network can be considered to be non-restorable otherwise and its (link) capacity can need to be augmented to make it fully restorable. The typical aim of link characterization is to classify links into various categories: e.g., the red links need capacity augments urgently, the yellow links will need capacity augments soon, and the green links do not require capacity augments in the near future. Link characterization can help in network management and/or can allow managers to better focus their efforts to urgent tasks. A capacity exhaust on a link can be taken to imply that it will not be possible to provision a new circuit on this link, as it will make the network non-restorable.

In any failure scenario, there can be several restoration paths for an affected circuit. The switches, and the capacity planning tools mimicking how the switches work, typically pick the shortest path with available capacity while estimating restoration needs. However, there need be nothing wrong in picking a longer path. A circuit can restore perfectly well on the longer path. A shorter path can be preferred as it is expected to use less of the network resources to restore the circuit.

Capacity Planning Simulation

Figure 4:
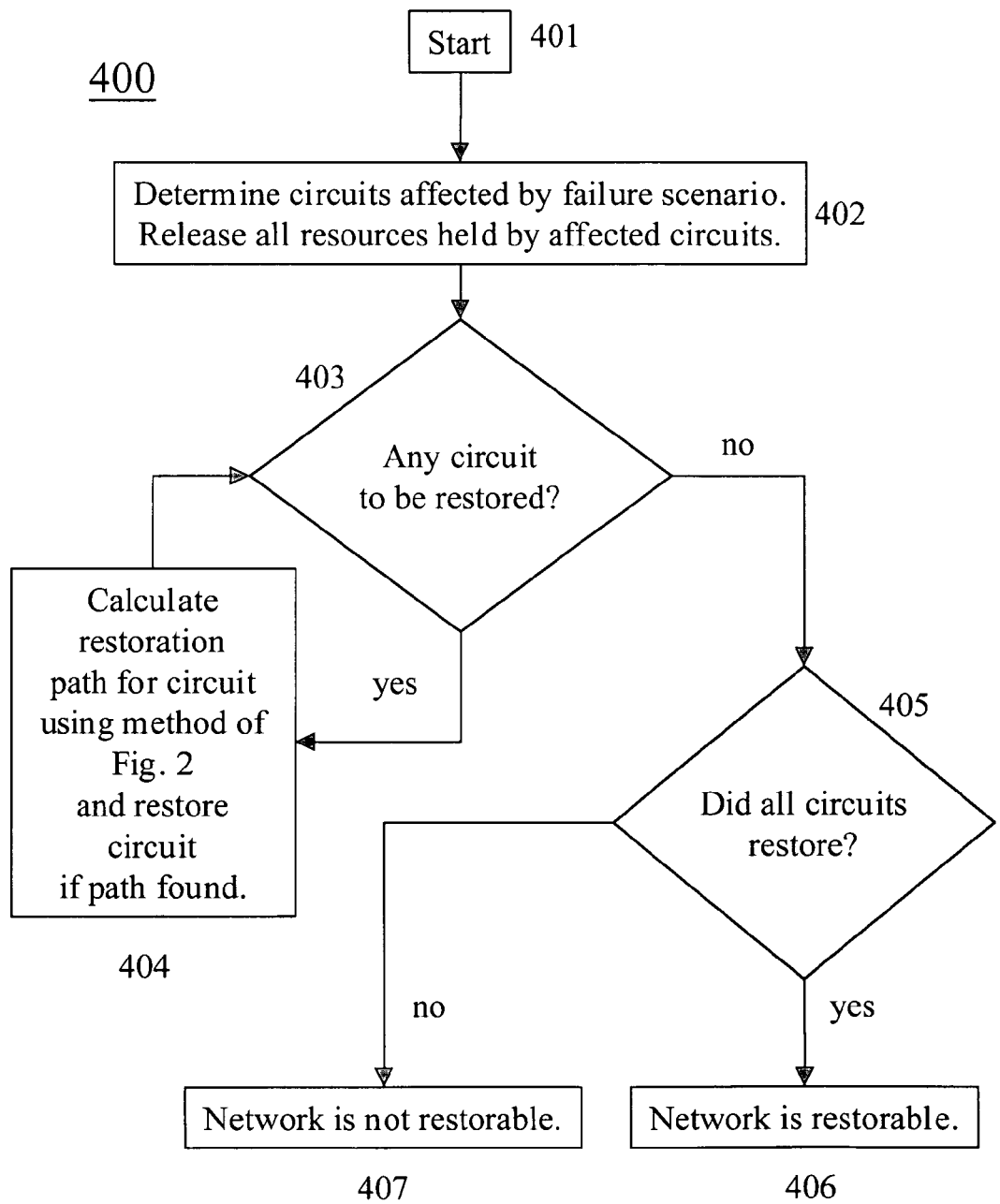
FIG. 4 is a flowchart of an exemplary embodiment of a method 400.

While working capacity can be directly measured, restoration capacity typically has to be estimated by running a simulation that cycles over all possible failure scenarios, mimics how the switches in the network will restore circuits affected by the failure, and/or then estimates the restoration capacity needed and whether the network is restorable or not. FIG. 4 describes illustrative simulation steps for one exemplary failure scenario. These steps can be repeated for all failure scenarios under consideration. For each failure scenario, the capacity needed for restoration on each link can be recorded. Once all the failure scenarios have been simulated, the restoration capacity requirement for a link can be taken to be the maximum restoration capacity needed over all failure scenarios.

A Simple Example

Consider a highly simplified example using the illustrative network of FIG. 3. Assume links 201, 202 have a capacity of 8 units (for example, STS1s) each, while the remaining links have a capacity of 4 units each. Assume also that there are 6 circuits, each of size 1 unit, provisioned between switches 101 and 103 with working path 21 consisting of links 201 and 202 for each circuit. Table 1 shows the total and working capacity of each link. The six circuits take up working capacity of 1 unit each on links 201 and 202 for a total of 6 units each. There are no circuits provisioned on links 203-207 and their working capacity is 0.

TABLE 1

Link Utilization and Characterization

| LINK | CAPACITY | | | | Utilization | Link Status |
|---|---|---|---|---|---|---|
| | Total | Working | Restoration | Spare | | |
| 201 | 8 | 6 | 0 | 2 | 75% | Yellow |
| 202 | 8 | 6 | 0 | 2 | 75% | Yellow |
| 203 | 4 | 0 | 4 | 0 | 100% | Red |
| 204 | 4 | 0 | 4 | 0 | 100% | Red |

TABLE 1-continued

Link Utilization and Characterization

| LINK | Total | Working | Restoration | Spare | Utilization | Link Status |
|---|---|---|---|---|---|---|
| 205 | 4 | 0 | 2 | 2 | 50% | Green |
| 206 | 4 | 0 | 2 | 2 | 50% | Green |
| 207 | 4 | 0 | 2 | 2 | 50% | Green |

If either link 201 or link 202 fails, then all six of the circuits are affected and need to be restored. For simplicity, we will ignore the details about administrative weights of links, etc. and simply assume that, on the basis of these weights, path 22 in FIG. 3 is a first, shorter, restoration path for each of these circuits, while path 23 is a second, longer, restoration path for these circuits. The links in each path have a capacity of 4 units and can thus accommodate only four of the six circuits.

In simulating a scenario in which link 201 fails, the affected circuits are released first. All six circuits are affected and after their release, there is no working capacity on any of the links and the capacity available for restoration on the links that have not failed equals their total capacity. Hence, 8 units of capacity are available on link 202, and 4 units each on links 203-207. The restoration paths for the six affected circuits is obtained one-by-one using the exemplary method in FIG. 2 as follows:

Circuit 1: Size Z=1.
  Step 301: Failed link 201 is pruned
  Step 302: Links 202-207 have sufficient available capacity and none are pruned
  Step 303: Yields path 22.
Circuit 2: Size Z=1.
  Step 301: Failed link 201 is pruned
  Step 302: No links are pruned
  Step 303: Yields path 22.
Circuit 3: Size Z=1.
  Step 301: Failed link 201 is pruned
  Step 302: No links are pruned
  Step 303: Yields path 22.
Circuit 4: Size Z=1.
  Step 301: Failed link 201 is pruned
  Step 302: No links are pruned
  Step 303: Yields path 22.
Circuit 5: Size Z=1.
  Step 301: Failed link 201 is pruned
  Step 302: Links 203-204 have available capacity<Z=1 unit and are pruned
  Step 303: Yields path 23.
Circuit 6: Size Z=1.
  Step 301: Failed link 201 is pruned
  Step 302: Links 203-204 have available capacity<Z=1 unit and are pruned
  Step 303: Yields path 23.

The simulation for failure of link 202 yields similar results. Hence, in the failure scenario simulations, for failure of either link 201 or 202, four of the six affected circuits restore on the first restoration path 22 consisting of links 203 and 204. The remaining two circuits restore on the second restoration path 23 consisting of links 205, 206 and 207. Hence, this leads to a restoration capacity requirement, calculated as the maximum requirement over all failure scenarios, of four units each on links 203-204, and 2 units each on links 205-207. This is also shown in the Table 1. There is no failure scenario in our example that requires restoration on links 201-202 and so their restoration capacity requirement is zero. The spare capacity is obtained by subtracting the working and restoration capacity from the total capacity and the link utilization is the sum of working and restoration capacity divided by the total capacity. Let us further assume in our example that we are characterizing links based on the rules that a utilization of 90% or higher means red, utilization between 70%-89% means yellow and 69% or lower means green. On the basis of these rules, links 201 and 202 get characterized as yellow, links 203, 204 as red and the remaining links as green.

A calculated utilization of 100% further implies that the capacity of links 203 and 204 has been fully exhausted and it is no longer possible to provision a new circuit on these links without making the network non-restorable. This statement, however, is not true. Lets see what happens if we indeed set up a new circuit in our example on these links. Assume that a circuit requiring 1 unit of capacity is set up between switches 101 and 103 on path 22 consisting of links 203 and 204. Further, assume that the restoration path for this circuit, in case either of links 203 or 204 fails, is path 21 consisting of links 201 and 202. The new utilization of each link is shown in Table 2. Now, 3 of the 6 circuits on path 21 restore on the shorter restoration path 22 and the other 3 restore on the longer restoration path 23 and the network is still fully restorable. So, in reality the links 203 and 204, even though they showed up as red and 100% utilized in Table 1, were not really exhausted. In fact, it is possible to provision one more circuit of size 1 unit on these links, indicating that up to 2 units of capacity is really available on these links.

TABLE 2

Link Utilization and Characterization with additional circuit

| LINK | Total | Working | Restoration | Spare | Utilization | Link Status |
|---|---|---|---|---|---|---|
| 201 | 8 | 6 | 1 | 1 | 87.5% | Yellow |
| 202 | 8 | 6 | 1 | 1 | 87.5% | Yellow |
| 203 | 4 | 1 | 3 | 0 | 100% | Red |
| 204 | 4 | 1 | 3 | 0 | 100% | Red |
| 205 | 4 | 0 | 3 | 1 | 75% | Yellow |
| 206 | 4 | 0 | 3 | 1 | 75% | Yellow |
| 207 | 4 | 0 | 3 | 1 | 75% | Yellow |

It is also interesting to see what happens if we augment the capacity of links indicated as red by the traditional method. Let us rework the example of Table 1 after the capacity of links 203 and 204 is increased to 5 units. The details are omitted and the results are shown in Table 3. Now, for the failure of either link 201 or 202, five of the circuits restore on path 22 and 1 on path 23.

TABLE 3

Link Utilization and Characterization

| LINK | Total | Working | Restoration | Spare | Utilization | Link Status |
|---|---|---|---|---|---|---|
| 201 | 8 | 6 | 0 | 2 | 75% | Yellow |
| 202 | 8 | 6 | 0 | 2 | 75% | Yellow |
| 203 | 5 | 0 | 5 | 0 | 100% | Red |
| 204 | 5 | 0 | 5 | 0 | 100% | Red |
| 205 | 4 | 0 | 1 | 3 | 25% | Green |
| 206 | 4 | 0 | 1 | 3 | 25% | Green |
| 207 | 4 | 0 | 1 | 3 | 25% | Green |

The links 203 and 204 still show up as red and fully exhausted as if augmenting their capacity by 1 had no effect.

For each failure scenario there can be several restoration paths for each affected circuit. The switches and capacity planning tools typically pick the shortest path. Hence, links in shorter paths tend to be used more often for restoration and fill up first while the links in longer paths tend to remain partially empty. Links in the shorter path can be characterized as red while those in the longer path can be characterized as green. This indicates that capacity on the shorter path is exhausted, but as shown, this need not be the case. One can still provision circuits on links in the shorter path without affecting the restorability of the network. Some of the circuits that previously restored on the shorter path can restore on the longer path. Hence, the links on the shorter path also can have available capacity and it can be desirable for their utilization to reflect this fact. Neither the links in the shorter path nor the links in the longer path need be indicated as red while there is capacity available in either one. It can be desirable to distribute the restoration capacity needs over the available paths so that links in shorter paths are no longer incorrectly characterized as red, and/or to find the maximum available capacity on each link in the network.

First New Method

Figure 5:
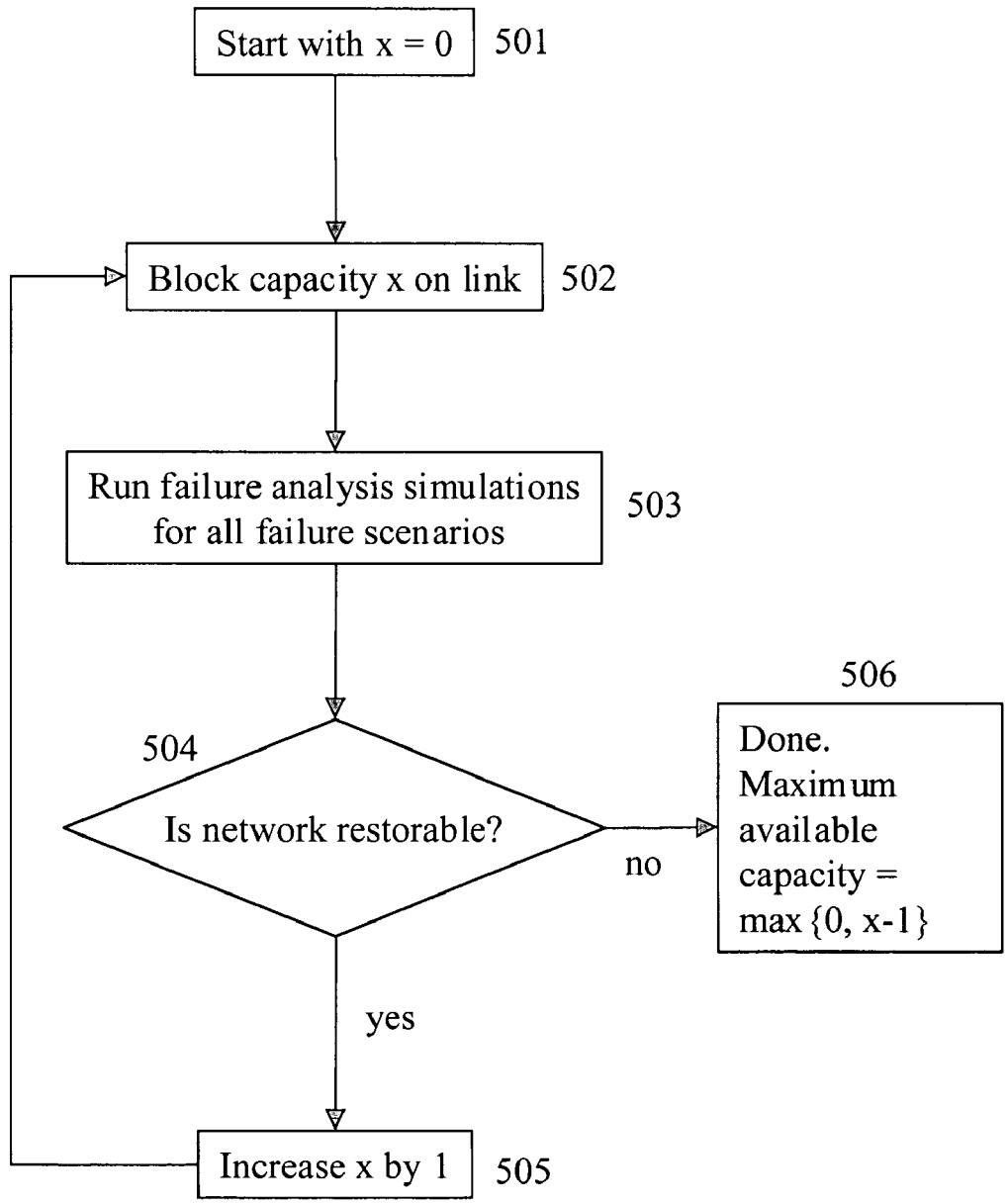
FIG. 5 is a flowchart of an exemplary embodiment of a method 500.

Our first new method is to find the maximum available capacity on each link in the network. One way to find out if there is capacity available on a link can be to block a certain amount of capacity on the link and then to run the capacity planning simulation. If the network remains fully restorable, then the amount of blocked capacity is indeed available on the link. To find if more capacity is available, the amount of blocked capacity can be increased. This can be repeated until the network is no longer fully restorable. This procedure can yield the maximum amount of capacity that can be blocked on the link without affecting network restorability and, hence, can be the maximum available capacity on the link. The flow chart of FIG. 5 lays out an exemplary embodiment of the method in detail.

To illustrate this method, let us apply it to our example and try to find the maximum available capacity on link 203.

Step 501: Start with x=0.
Step 502: x=0 units of capacity are blocked on link 203.
Step 503: Details of capacity planning simulation are similar to earlier description and are not shown. Four circuits restore on path 22 and 2 on path 23.
Step 504: Network is restorable.
Step 505: x is increased to 1
Step 502: 1 unit of capacity is blocked on link 203.
Step 503: Three circuits restore on path 22 and three on path 23.
Step 504: Network is restorable.
Step 505: x is increased to 2
Step 502: 2 units of capacity are blocked on link 203.
Step 503: Two circuits restore on path 22 and four on path 23.
Step 504: Network is restorable.
Step 505: x is increased to 3
Step 502: 3 units of capacity are blocked on link 203.
Step 503: One circuit restores on path 22, four on path 23, and one does not restore.
Step 504: Network is no longer restorable.
Step 506: The maximum available capacity on link 203 is 2 units.

The procedure then can be repeated for every link in the network. If this is done, then the results shown in Table 4 are obtained for our original example of Table 1.

TABLE 4

Maximum Available Capacity and Link Characterization

| LINK | CAPACITY | | |
|---|---|---|---|
| | Total | Working | Maximum Available |
| 201 | 8 | 6 | 2 |
| 202 | 8 | 6 | 2 |
| 203 | 4 | 0 | 2 |
| 204 | 4 | 0 | 2 |
| 205 | 4 | 0 | 2 |
| 206 | 4 | 0 | 2 |
| 207 | 4 | 0 | 2 |

The results in Table 4 show a very different picture than those in Table 1, which indicated that links 203 and 204 were exhausted and red while links 205-207 had 2 units of available capacity and were green. Table 4, on the other hand, shows that all of these links have a maximum available capacity of 2 units and in that sense should be in a different state than the one indicated by Table 1.

The capacity planning simulation can evaluate a large number of failure scenarios. For each scenario, it can determine the affected circuits, fail them, then calculate a restoration route for each circuit, and/or set it up on that route. Consequently, each simulation can take a fair amount of time. Method 1 clearly can work but can encounter long runtimes with large networks. There can be several hundred links in a large network, and each link can require tens of simulations with different amounts of blocked capacity to find the maximum available capacity. This means that the capacity planning simulation might be run thousands of times, clearly a time-consuming task. Hence, a quicker solution that is better able to characterize the links, even if it does not find the maximum available bandwidth on every link, can be desirable.

Second New Method

Figure 6:
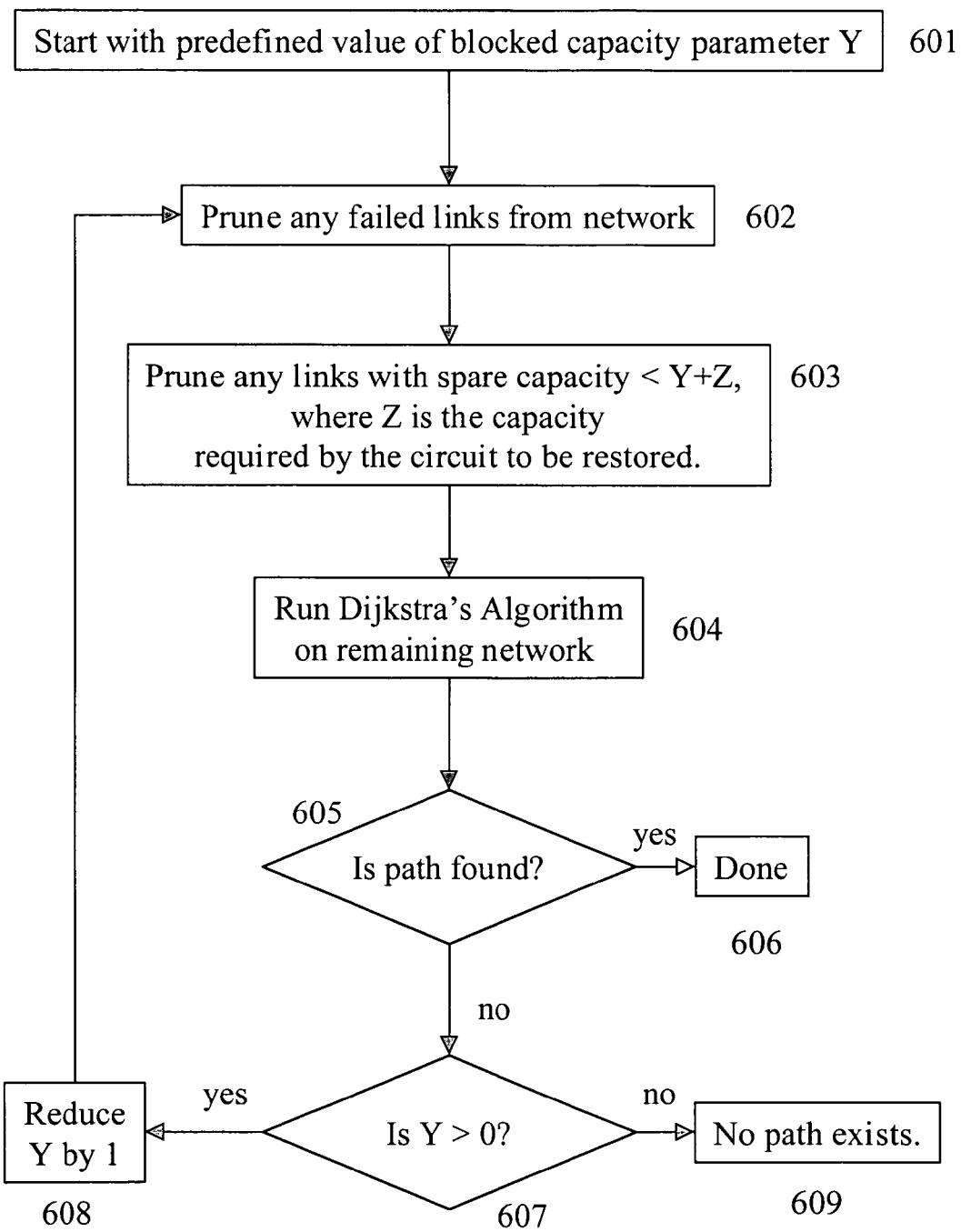
FIG. 6 is a flowchart of an exemplary embodiment of a method 600.

Our second method modifies the way restoration paths are selected in the restoration simulation. That is, we modify the way step 404 in FIG. 4 is computed. The computation for step 404 using our first method is shown in FIG. 2. The Dijkstra algorithm in this procedure can find the shortest path. Shorter path need not be strictly preferred over longer paths in our second method. Instead we can reserve or block a pre-specified amount of capacity on each link and then apply the traditional procedure. By blocking capacity we often invalidate the shortest path found by the traditional procedure, if it has less spare capacity than the amount blocked, and thus can force the circuit to be restored on a longer path provided it has more spare capacity than the amount of capacity blocked. If there is no path found with the current amount of blocked capacity, then the amount of blocked capacity can be reduced. This can be repeated; each time with less blocked capacity, until either a path is found or no capacity is blocked (in which case, no path exists). Using this method, any link can be considered exhausted only if there is no alternative path with available capacity. FIG. 6 shows an example of how this procedure can be implemented.

We now illustrate this new method using our simple example. Assume that the predefined value of Y=2 units. In simulating a scenario in which link 201 fails, the affected circuits are released first. All six circuits are affected and after their release, there is no working capacity on any of the links and the capacity available for restoration on the links that have not failed equals their total capacity. Hence, 8 units of capacity are available on link 202, and 4 units each on links 203-207. The restoration paths for the six affected circuits are obtained one-by-one using the method in FIG. 6 as follows:

Circuit 1: Size Z=1
    Step 601: Y=2
    Step 602: Prune failed link 201
    Step 603: To prune links with spare capacity<3. No links pruned.
    Step 604: Yields path 22.
Circuit 2: Size Z=1
    Step 601: Y=2
    Step 602: Prune failed link 201
    Step 603: To prune links with spare capacity<3. No links pruned.
    Step 604: Yields path 22.
Circuit 3: Size Z=1
    Step 601: Y=2
    Step 602: Prune failed link 201
    Step 603: To prune links with spare capacity<3. Links 203 and 204 pruned.
    Step 604: Yields path 23.
Circuit 4: Size Z=1
    Step 601: Y=2
    Step 602: Prune failed link 201
    Step 603: To prune links with spare capacity<3. Links 203 and 204 pruned.
    Step 604: Yields path 23.
Circuit 5: Size Z=1
    Step 601: Y=2
    Step 602: Prune failed link 201
    Step 603: To prune links with spare capacity<3. Links 203-207 pruned.
    Step 604-607: No path exists & Y>0.
    Step 608: Y reduced to 1.
    Step 602: Prune failed link 201
    Step 603: To prune links with spare capacity<2. No links pruned.
    Step 604: Yields path 22.
Circuit 6: Size Z=1
    Step 601: Y=2
    Step 602: Prune failed link 201
    Step 603: To prune links with spare capacity<3. Links 203-207 pruned.
    Step 604-607: No path exists & Y>0.
    Step 608: Y reduced to 1.
    Step 602: Prune failed link 201
    Step 603: To prune links with spare capacity<2. Links 203 and 204 pruned.
    Step 604: Yields path 23.

The end result of our new method for this example is that three circuits are restored on path 22 and three on path 23. Recall that the traditional method restored four circuits on path 22 and two on path 23. Hence, our method can be considered better able to distribute the restoration between shorter and longer paths. Table 5 shows the utilization calculation based on our new method.

TABLE 5

New Link Utilization and Characterization

| | | | CAPACITY | | | |
|---|---|---|---|---|---|---|
| LINK | Total | Working | Restoration | Spare | Utilization | Link Status |
| 201 | 8 | 6 | 0 | 2 | 75% | Yellow |
| 202 | 8 | 6 | 0 | 2 | 75% | Yellow |
| 203 | 4 | 0 | 3 | 1 | 75% | Yellow |
| 204 | 4 | 0 | 3 | 1 | 75% | Yellow |
| 205 | 4 | 0 | 3 | 1 | 75% | Yellow |
| 206 | 4 | 0 | 3 | 1 | 75% | Yellow |
| 207 | 4 | 0 | 3 | 1 | 75% | Yellow |

As can be seen, links 203 and 204 no longer show up as red and links 205, 206, and 207 are not green any more. Instead all of these links show up as yellow. The restoration capacity needs were more equally distributed on these links instead of being concentrated on the links in the shorter restoration path.

Our second method does not pick the shorter path consistently over the longer paths. This can be considered why the traditional method can falsely lead to the capacity on some links showing up as exhausted while others still have a large amount of spare capacity. Our second method can be considered to effectively modify the method of path selection to prefer a longer path if it has more than a pre-specified amount of spare capacity and the shorter path has less the pre-specified amount of spare capacity. In effect, our second method can be viewed as blocking a certain amount of capacity on all links before calculating paths. If no path is found, the amount of blocked capacity is reduced and a path computation attempted again. Thus, capacity need not be blocked on one link at a time but rather can be blocked on all links simultaneously in the network. Hence, one run of the capacity planning simulation can suffice for all links in the network with one level of blocked capacity, and the amount of blocked capacity can be successively reduced if no path is found. Without the latter feature, a capacity planning simulation with just a fixed amount of blocked capacity on all links will not necessarily be able to restore all failed circuits unless the amount of blocked capacity is very small. By successively reducing the blocked capacity in path computations, we can resolve the cases with smaller amounts of capacity blocked on certain links if no paths are available. Only a few runs of the capacity planning simulation, possibly utilizing a more complicated procedure for calculating restoration paths, might be needed to evaluate multiple levels of blocked capacity.

Figure 7:
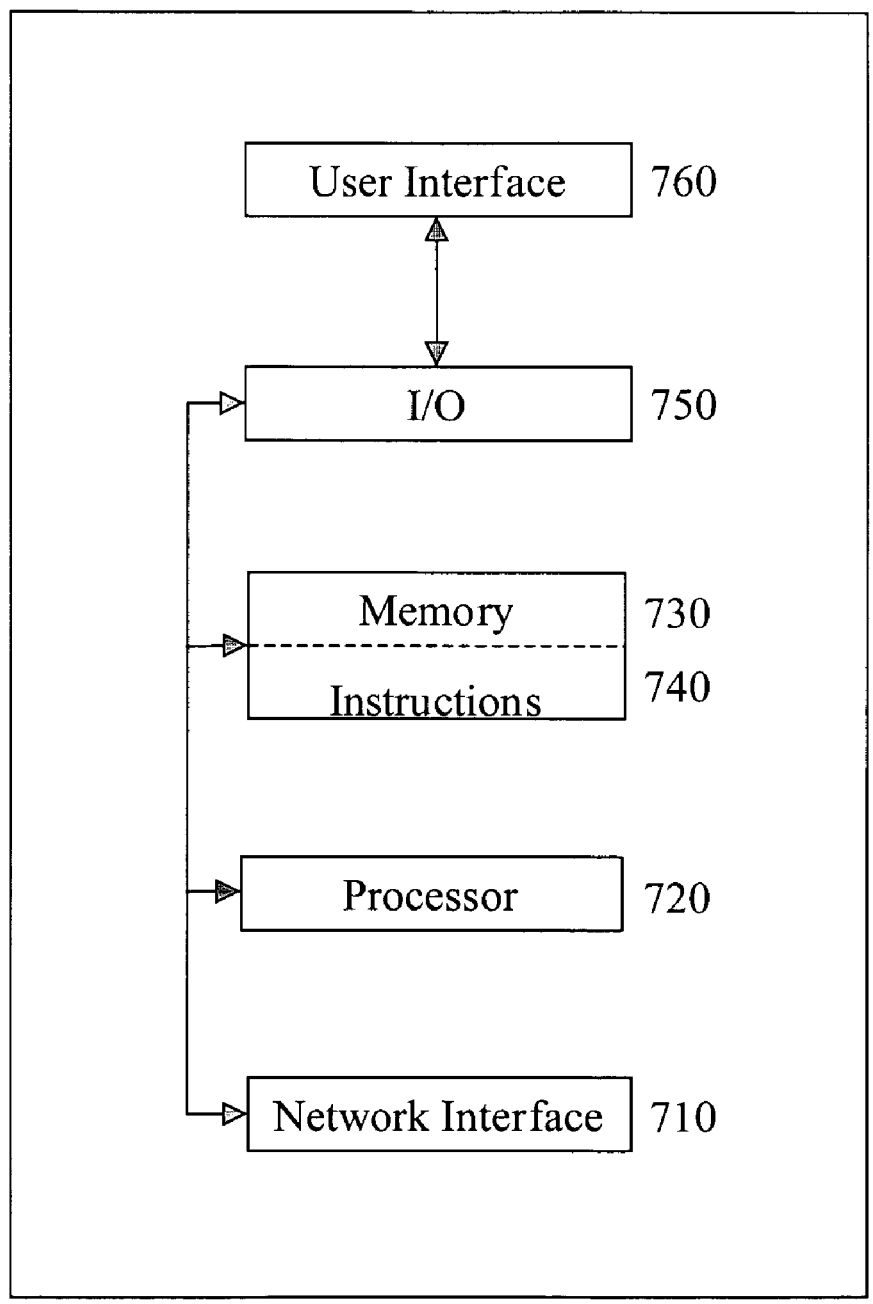
FIG. 7 is a block diagram of an exemplary embodiment of an information device 700.

FIG. 7 is a block diagram of an exemplary embodiment of an information device 700, which in certain operative embodiments can comprise, for example, a computer, a switch, router, simulation platform, etc. Information device 700 can comprise any of numerous components, such as for example, one or more network interfaces 710, one or more processors 720, one or more memories 730 containing instructions 740, one or more input/output (I/O) devices 750, and/or one or more user interfaces 760 coupled to I/O device 750, etc.

In certain exemplary embodiments, via one or more user interfaces 760, such as a graphical user interface, a user can view a rendering of information related to specifying, designing, configuring, simulating, operating, maintaining, restoring, and/or managing, etc., a circuit-switched communication network.

When the following terms are used substantively herein, the accompanying definitions apply:

a—at least one.

accommodate—to operably provide for, service, hold, and/or carry, activity—an action, act, step, and/or process or portion thereof.

adapted to—made suitable or fit for a specific use or situation.

affect—to interrupt, influence, and/or effect a change in.

amount—quantity.

apparatus—an appliance or device for a particular purpose backbone network—a "transit" network often made up of long-distance telephone trunk lines and other wired and wireless links such as microwave and satellite links for use in transmitting large amounts of data simultaneously between host computer systems connected to the Internet. Normal communicated data typically neither originates nor terminates in a backbone network.

block—to treat as unavailable and/or to interrupt the proper functioning of.

can—is capable of, in at least some embodiments.

capacity—bandwidth.

capacity planning simulation—a computer-based exercise and/or technique for predicting the behavior of a network in which a mathematically-based model of the system is established, then certain of the model's variables are altered to determine their effects on a scheme or program for the accomplishment, enactment, or attainment of adequate bandwidth in the network.

circuit—a communications connection established across two or more switching devices comprised by a network and between corresponding end systems connected to, but not comprised by the network. The sequence of links spanned by the circuit is called its service (or working) route (or path). If there is a failure in the network affecting one or more of the links or switches in the service route of the circuit, then the circuit fails as well. In this case, the circuit can be re-routed on a new restoration route that avoids the failed portions of the network. When the failure is repaired, the circuit can be reverted back to its original service route.

circuit-switched communication network—a backbone network comprising a plurality of switching devices connected by a plurality of communication links to temporarily establish a physical circuit on demand until a disconnect signal is received. A typical circuit-switched communication network is capable of carrying many circuits, each circuit formed from a plurality of links. A circuit-switched communication network can be an optical switch and/or optical cross connect network; ATM network; Frame Relay network; network of MPLS enabled label switched routers; and/or network of Lambda (optical wavelength) routers; etc.

comprising—including but not limited to.

data—distinct pieces of information, usually formatted in a special or predetermined way and/or organized to express concepts.

define—to establish the outline, form, or structure of.

determine—to ascertain, obtain, and/or calculate.

device—a machine, manufacture, and/or collection thereof.

fail—to designate and/or treat as functioning improperly and/or inoperative.

failure scenario—an outline or model of an expected or supposed sequence of events relating to one or more improperly functioning and/or inoperative circuits.

fully restorable—having sufficient capacity in a network to restore all affected circuits for all failure scenarios under consideration.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

impact—to have an effect and/or influence on.

increase—to make and/or become greater and/or larger.

indication—a sign or suggestion.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function.

link—a communication channel between a pair of switching devices.

machine instructions—directions adapted to cause a machine to perform a particular operation or function.

machine readable medium—a physical structure from which a machine can obtain data and/or information. Examples include a memory, memory device, punch cards, bar code, etc.

maximum available capacity—the maximum amount of bandwidth that can be blocked on the link without affecting network restorability.

may—is allowed to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

non-restorable—not fully restorable.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

prune—to remove and/or eliminate from use and/or consideration.

reduce—to make and/or become lesser and/or smaller.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

restoration path—a plurality of links over which a circuit can be restored.

restore—to re-establish and/or bring back into use.

result—an outcome and/or consequence of a particular action, operation, and/or course.

run—to perform, process, and/or calculate.

select—to choose.

set—a related plurality.

set-up—to establish.

shortest path algorithm—Dijkstra's algorithm or a variant thereof for finding the shortest path from source to a destination. The goal can be expressed as, when given a connected graph $G=(V,E)$, a weight $d: E \rightarrow R+$ and a fixed vertex s in V, find a shortest path from s to each vertex v in V. The goal can be accomplished via any number of algorithms, such as Dijkstra's algorithm, which is as follows:
1. Set $i=0$, $S0=\{u0=s\}$, $L(u0)=0$, and $L(v)=$infinity for $v \Diamond u0$. If $|V|=1$ then stop, otherwise go to step 2.
2. For each v in V\Si, replace $L(v)$ by $\min\{L(v), L(ui)+ dvui\}$. If $L(v)$ is replaced, put a label $(L(v), ui)$ on v.
3. Find a vertex v which minimizes $\{L(v): v$ in $V\backslash Si\}$, say $ui+1$.
4. Let $Si+1=Si$ cup $\{ui+1\}$.
5. Replace i by $i+1$. If $i=|V|-1$ then stop, otherwise go to step 2.

spare capacity—link bandwidth remaining after accounting for working traffic and restoration.

store—to place, hold, and/or retain data, typically in a memory.

substantially—to a great extent or degree.

switching device—a switch and/or router, etc.

system—a collection of mechanisms, devices, data, and/or instructions, the collection designed to perform one or more specific functions.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

As used substantively herein, the following terms are abbreviated as listed below:

| | |
|---|---|
| ATM | Asynchronous Transfer Mode |
| IP | Internet Protocol |
| LSP | Label Switched Path |
| MPLS | Multi-Protocol Label Switching |
| OC-N | Optical Carrier for Nth Level |
| OSPF | Open Shortest Path First |
| PNNI | Private Network to Network Interface |
| STS-N | Synchronous Transport Signal-Level N |

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method comprising a plurality of activities, comprising:
   via a capacity planning simulation performed on an information device, for each circuit from a plurality of circuits affected by a selected failure scenario from a plurality of failure scenarios of a circuit-switched communication network, all links impacted by the selected failure scenario pruned from a network of unaffected links:
   failing the affected circuit;
   for a remaining network comprised of all unaffected links, repeatedly:
      blocking a predetermined amount of capacity of each of the unaffected links, the information device adapted to prune any links from the network that lack sufficient capacity to restore the affected circuit, the information device adapted to run Dijkstra's Algorithm on remaining unaffected links;
      determining that the circuit-switched communication network is not fully restorable; and
      reducing the amount of blocked capacity of each of the unaffected links;
   the information device adapted to, responsive to a determination that a path is found for the affected circuit, render an indication that unaffected links have a maximum available capacity of at least said predetermined amount of capacity associated with the circuit-switched communication network being fully restorable, the indication comprising capacity information for each unaffected link subsequent to the selected failure scenario; and
   the information device adapted to, responsive to a determination that no capacity is blocked and no path is found render an indication that no path exists.

2. The method of claim 1, further comprising:
pruning all links impacted by the selected failure scenario.

3. The method of claim 1, further comprising:
pruning any unaffected links with insufficient spare capacity to accommodate the affected circuit.

4. The method of claim 1, further comprising:
running a shortest path algorithm on the remaining network.

5. The method of claim 1, further comprising:
determining a restoration path for the affected circuit.

6. The method of claim 1, further comprising:
restoring the affected circuit on a determined restoration path.

7. The method of claim 1, further comprising:
determining if the affected circuit is restorable.

8. The method of claim 1, further comprising:
rendering an indication of whether the affected circuit is restorable.

9. The method of claim 1, further comprising:
determining if the circuit-switched communication network is restorable for each of the plurality of failure scenarios.

10. The method of claim 1, further comprising:
rendering an indication of whether the circuit-switched communication network is restorable for the plurality of failure scenarios.

11. The method of claim 1, further comprising performing said plurality of activities for each failure scenario from the plurality of failure scenarios.

12. The method of claim 1, further comprising:
determining the plurality of failure scenarios.

13. The method of claim 1, further comprising:
selecting the selected failure scenario.

14. The method of claim 1, further comprising:
for each failure scenario of the plurality of failure scenarios, determining the plurality of affected circuits.

15. A machine-readable medium storing machine instructions for a plurality of activities, comprising:
via a capacity planning simulation performed on an information device, for each circuit from a plurality of circuits affected by a selected failure scenario from a plurality of failure scenarios of a circuit-switched communication network, all links impacted by the selected failure scenario pruned from a network of unaffected links:
failing the affected circuit;
for a remaining network comprised of all unaffected links repeatedly:
blocking a predetermined amount of capacity of each of the unaffected links, the information device adapted to prune any links from the network that lack sufficient capacity to restore the affected circuit, the information device adapted to run Dijkstra's Algorithm on remaining unaffected links;
determining that the circuit-switched communication network is not fully restorable; and
reducing the amount of blocked capacity of each of the unaffected links; and
the information device adapted to, responsive to a determination that a path is found, render an indication that unaffected links have a maximum available capacity of at least said predetermined amount of capacity associated with the circuit-switched communication network being fully restorable, the indication comprising capacity information for each unaffected link subsequent to the selected failure scenario; and
the information device adapted to, responsive to a determination that no capacity is blocked render an indication that no path exists.

16. A method, comprising:
via a capacity planning simulation:
for each circuit from a plurality of circuits affected by a selected failure scenario from a plurality of failure scenarios of a circuit-switched communication network, the circuit-switched communicating network comprising a restoration path, all links impacted by the selected failure scenario pruned from a network of unaffected links:
failing the affected circuit;
selecting unaffected links;
for a remaining network comprised of all unaffected links:
blocking a predetermined amount of capacity on each of the unaffected links, the simulation adapted to prune any links from the network that lack sufficient capacity to restore the affected circuit, the simulation adapted to run Dijkstra's Algorithm on remaining unaffected links; and
repeatedly:
determining that said remaining network comprises no restoration path over any set of the unaffected links; and
reducing the predetermined amount of capacity on each of the unaffected links; and
once a restoration path is determined for the affected circuit or no capacity is blocked, rendering a result of the capacity planning simulation.

17. The method of claim 16, further comprising:
determining the plurality of failure scenarios.

18. The method of claim 16, further comprising:
for each failure scenario of the plurality of failure scenarios, determining the plurality of affected circuits.

19. The method of claim 16, further comprising:
if the restoration path is found, setting up the affected circuit on the restoration path.

20. The method of claim 16, further comprising:
if no capacity is blocked, indicating that no restoration path exists.

21. The method of claim 16, further comprising:
pruning all links impacted by the selected failure scenario.

22. The method of claim 16, further comprising:
pruning any unaffected links with insufficient spare capacity to accommodate the affected circuit.

23. The method of claim 16, further comprising:
running a shortest path algorithm on the remaining network.

24. The method of claim 16, further comprising:
determining if each affected circuit is restorable.

25. The method of claim 16, further comprising:
rendering an indication of whether each affected circuit is restorable.

26. The method of claim 16, further comprising:
determining the restoration path for the affected circuit.

27. The method of claim 16, further comprising:
restoring the affected circuit on the restoration path.

28. The method of claim 16, further comprising:
determining if the circuit-switched communication network is restorable for each of the plurality of failure scenarios.

29. The method of claim 16, further comprising:
rendering an indication of whether the circuit-switched communication network is restorable for the plurality of failure scenarios.

30. A machine-readable medium storing machine instructions for a plurality of activities, comprising:
via a capacity planning simulation:
for each circuit from a plurality of circuits affected by a selected failure scenario from a plurality of failure scenarios of a circuit-switched communication network, the circuit-switched communication network comprising a restoration path, all links impacted by the selected failure scenario pruned from a network of unaffected links:
failing the affected circuit;
selecting unaffected links;
for a remaining network comprised of all unaffected links:
blocking a predetermined amount of capacity on each of the unaffected links, the simulation adapted to prune any links from the network that lack sufficient capacity to restore the affected circuit, the simulation adapted to run Dijkstra's Algorithm on remaining unaffected links; and
repeatedly:
determining that said remaining network comprises no restoration path over any set of the unaffected links; and
reducing the predetermined amount of capacity on each of the unaffected links; and
once a restoration path is determined for the affected circuit or no capacity is blocked, rendering a result of the capacity planning simulation.

* * * * *